US010980000B2

(12) United States Patent
Tamura et al.

(10) Patent No.: US 10,980,000 B2
(45) Date of Patent: *Apr. 13, 2021

(54) MOBILE COMMUNICATION SYSTEM, MME, INCOMING CALL CONTROL METHOD OF MOBILE COMMUNICATION SYSTEM, AND INCOMING CALL CONTROL METHOD OF MME

(71) Applicant: NEC CORPORATION, Tokyo (JP)

(72) Inventors: Toshiyuki Tamura, Tokyo (JP); Junya Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,579

(22) Filed: Nov. 6, 2017

(65) Prior Publication Data

US 2018/0139721 A1    May 17, 2018

Related U.S. Application Data

(63) Continuation of application No. 15/422,962, filed on Feb. 2, 2017, now Pat. No. 9,839,004, which is a
(Continued)

(30) Foreign Application Priority Data

Apr. 5, 2013 (JP) .................................. 2013-079961
Jul. 5, 2013 (JP) .................................. 2013-141828

(51) Int. Cl.
H04W 36/00 (2009.01)
H04W 68/12 (2009.01)
(Continued)

(52) U.S. Cl.
CPC ............. *H04W 68/12* (2013.01); *H04W 8/12* (2013.01); *H04W 36/0022* (2013.01);
(Continued)

(58) Field of Classification Search
CPC ..... H04W 36/04; H04W 36/18; H04W 36/30; H04W 36/32
(Continued)

(56) References Cited

U.S. PATENT DOCUMENTS

2005/0004898 A1    1/2005 Bluhm
2005/0048982 A1*   3/2005 Roland ................. H04W 48/16
                                              455/449
(Continued)

FOREIGN PATENT DOCUMENTS

WO    WO 2013/048100 A1    4/2013

OTHER PUBLICATIONS

Notification of Reasons for Refusal Office Action dated Oct. 23, 2018, from the Japanese Patent Office citing reference in counterpart Japanese Patent Application No. 2017-144387.
(Continued)

*Primary Examiner* — Matthew W Genack
(74) *Attorney, Agent, or Firm* — Finnegan, Henderson, Farabow, Garrett & Dunner, L.L.P.

(57) ABSTRACT

It is aimed to provide a mobility management device that can normally provide a UE with a notification of an incoming voice call made when ISR is activated and when a mobile communication device is moving from a location registration area under control of an MME to a location registration area under control of an SGSN. A mobility management device (10) makes an ISR feature operate in collaboration with an SGSN (20). It is assumed that a location registration area (60) managed by the mobility management device (10) exists within a location registration area (50) managed by the SGSN (20), and an incoming voice call is made to a mobile communication device (30) during when the mobile communication device (30) is moving out of the location registration area (60). The mobility management device (10)
(Continued)

includes an incoming voice call control unit (11) that, in the above case, sends a response message indicating that the mobile communication device (30) is moving to a switching device (40) and, when an incoming voice call message is sent again from the switching device (40) to a switching device (40) after the lapse of a specified period of time, performs call attempt to the mobile communication device (30).

14 Claims, 8 Drawing Sheets

Related U.S. Application Data continuation of application No. 15/057,871, filed on Mar. 1, 2016, now Pat. No. 9,596,626, which is a continuation of application No. 14/419,703, filed as application No. PCT/JP2013/007567 on Dec. 25, 2013, now Pat. No. 9,344,936.

(51) Int. Cl.
*H04W 8/12* (2009.01)
*H04W 36/06* (2009.01)
*H04W 68/00* (2009.01)
*H04W 60/04* (2009.01)

(52) U.S. Cl.
CPC ......... *H04W 36/06* (2013.01); *H04W 68/005* (2013.01); *H04W 60/04* (2013.01)

(58) Field of Classification Search
USPC .................................................. 455/436–444
See application file for complete search history.

(56) References Cited

U.S. PATENT DOCUMENTS

| | | | | |
|---|---|---|---|---|
| 2008/0253329 | A1* | 10/2008 | Asou | H04W 36/0016 370/331 |
| 2010/0172322 | A1* | 7/2010 | Yokota | H04W 36/02 370/331 |
| 2010/0272025 | A1 | 10/2010 | Yu | |
| 2010/0317375 | A1 | 12/2010 | Burbidge et al. | |
| 2011/0021216 | A1* | 1/2011 | Pudney | H04W 4/12 455/466 |
| 2011/0110302 | A1 | 5/2011 | Faurie et al. | |
| 2011/0243097 | A1* | 10/2011 | Lindqvist | H04W 24/02 370/331 |
| 2011/0274046 | A1 | 10/2011 | Rune et al. | |
| 2012/0032945 | A1 | 2/2012 | Dare et al. | |
| 2012/0069731 | A1 | 3/2012 | Tooher et al. | |
| 2012/0172066 | A1 | 7/2012 | Okabe et al. | |
| 2012/0257571 | A1* | 10/2012 | Liao | H04W 4/70 370/328 |
| 2012/0329452 | A1* | 12/2012 | Tokuda | H04W 36/0066 455/426.1 |
| 2013/0045738 | A1 | 2/2013 | Chen | |
| 2014/0105028 | A1* | 4/2014 | Bhaskaran | H04W 48/18 370/242 |

OTHER PUBLICATIONS

First Office Action issued by The State Intellectual Property Office of the People's Republic of China Patent Office in counterpart Chinese Patent Application No. 201380049168.5, dated Sep. 19, 2017.
Alcatel-Lucent, "Corrections to SGs paging for CSFB", 3GPP TSG-SA WG2 Meeting #88E, S2-120270, R1-140168, Version 10.6.0, 5 pages, (2012).
3GPP TS 23.272, 3rd Generation Partnership Project; Technical Specification Group Services and System Aspects, Circuit Switched (CS) fallback in Evolved Packet System (EPS), Stage 2, (Release 11), 22 pages, (2013).
Notification of Reasons for Refusal Office Action dated Jul. 3, 2018, from the Japanese Patent Office citing reference in counterpart Japanese Patent Application No. 2017-144387.
3GPP.TS 23.272 V11.4.0 3rd Generation Partnership Project;Technical Specification Group Services and System Aspects; Circuit Switched (CS) fallback in Evolved Packet System (EPS); Stage 2 (Release 11).Mar. 2013.
3GPP TSGSA2 Meeting #98, GPP TSGSA2, S2-132793, Revision from S2-132449, Valencia Spain, Jul. 15-19, 2013.
Search and Examination Report dated May 29, 2019 from UAE Patent Office by the UAE Patent Application No. 373/2015.
3GPP TSG CT WG1 Meeting #57 C1-091355 , Revision of C1-091187 San Antonio (TX), USA, Feb. 9-19, 2009.
Office Action dated Sep. 16, 2019, issued by the Indian Patent Office in counterpart Indian Patent Application No. 1269/ DELNP/2015.

* cited by examiner

MOBILE COMMUNICATION SYSTEM, MME, INCOMING CALL CONTROL METHOD OF MOBILE COMMUNICATION SYSTEM, AND INCOMING CALL CONTROL METHOD OF MME

CROSS-REFERENCE TO RELATED PATENT APPLICATIONS

This application is a continuation of U.S. patent application Ser. No. 15/422,962 filed Feb. 2, 2017, which is a continuation of application Ser. No. 15/057,871 filed Mar. 1, 2016, which is a continuation of application Ser. No. 14/419,703 filed Feb. 5, 2015, which is a National Stage Entry of International Application No. PCT/JP2013/007567, filed Dec. 25, 2013, which claims priority from Japanese Patent Application No. 2013-079961, filed Apr. 5, 2013 and Japanese Patent Application No. 2013-141828, filed Jul. 5, 2013. The entire contents of the above-referenced applications are expressly incorporated herein by reference.

TECHNICAL FIELD

The present invention relates to a mobility management device, a communication system, an incoming voice call control method and a program and, for example, relates to a mobility management device, a communication system, an incoming voice call control method and a program using the ISR feature. An incoming voice call described in this invention includes a multimedia communication such as a video telephone.

BACKGROUND ART

In the 3GPP (Third Generation Partnership Project) that defines a standard for mobile network systems, EPC (Evolved Packet Core) is specified as the next generation mobile network system. The EPC is a network system that accommodates an LTE (Long Term Evolution) access network in addition to radio access networks called the second generation and the third generation.

The state where a mobile communication device that is located in an LTE wireless area is connected to the EPC is referred to as "ECM-CONNECTED" state. The mobile communication device may be referred to as a mobile terminal device. Further, the mobile communication device is defined as a UE (User Equipment) in the 3GPP. Furthermore, a device that manages the location of the UE that is located in the LTE wireless area is MME (Mobility Management Entity), and a device that manages the location of the UE that is located in the second and third generation wireless area (which is referred to as "3G wireless area") is SGSN (Serving GPRS Support Node).

It is anticipated that, initially after introduction of the LTE wireless area, the LTE wireless area will be gradually broadened, overlaying the 3G wireless area. In the case where the LTE wireless area and the 3G wireless area overlap and the LTE wireless area is small, switching between the LTE wireless area and the 3G wireless area is anticipated to occur frequently in the UE that is located at the end of the LTE wireless area. The frequent switching between the LTE wireless area and the 3G wireless area causes problems such as an increase in network processing load due to location registration processing and battery consumption of the UE.

In Non Patent Literature 1, the LTE/3G location registration skip feature (ISR (Idle mode Signaling Reduction) feature; hereinafter referred to as the ISR feature) that does not carry out location registration even when a UE moves to a different area unless there is no change in the location registration area that has been registered before in the LTE wireless area and the 3G wireless area. Enabling the ISR reduces the number of times location registration is carried out, and it is thereby possible to solve the problems of an increase in network processing load and UE battery consumption.

CITATION LIST

Non Patent Literature

[NPL 1] "SAE basic control technology to achieve the ALL-IP network", NTT DOCOMO Technical Journal, Vol. 17, No. 3, October 2009

SUMMARY OF INVENTION

Technical Problem

In the case where a UE in the ECM-CONNECTED state is located in the location registration area under control of the MME and when an incoming voice call is made from MSC (Mobile Switching Center)/VLR (Visitor Location Register) to the UE, the MSC/VLR notifies the MME that an incoming voice call to the UE has occurred. The MME notifies the MSC/VLR that it has received the incoming voice call to the UE. Further, the MME notifies the UE that the incoming voice call has arrived. At this time, the MSC/VLR stops a timer for retransmission of an incoming call notification and enters a mode to wait for a response from the UE because the incoming voice call notification has been accepted. Note that, if the MME sends an incoming call notification to the UE during the processing (handover) that the UE moves from the location registration area under control of the MME to the location registration area under control of the SGSN, the incoming call notification does not reach the UE in some cases.

If the UE is moved to the location registration area under control of the MME or the SGSN where the ISR is not activated, location registration for an incoming voice call is newly performed by the UE for the MSC/VLR in the location registration area under control of the MME or the SGSN where the ISR is not activated to which the UE is moved. Therefore, the MSC/VLR can notify the incoming voice call again to the UE located in the location registration area under control of the MME or the SGSN where the ISR is not activated to which the UE is moved. On the other hand, when the UE is moved to the location registration area under control of the SGSN where the ISR is activated, location registration is not performed by the UE. Therefore, when the MME sends an incoming call notification to the UE during handover of the UE and therefore the incoming call notification does not reach the UE, the MSC/VLR cannot notify the incoming voice call again to the UE located in the location registration area under control of the SGSN where the ISR is activated, which causes a failure in an incoming voice call to the UE.

An exemplary object of the invention is to normally provide a UE with a notification of an incoming voice call that is made when ISR is activated in an MME and an SGSN and when a mobile communication device is moving from a location registration area under control of the MME to a location registration area under control of the SGSN.

Solution to Problem

A mobility management device according to a first exemplary aspect of the invention is a mobility management device that makes an ISR feature operate in collaboration with an SGSN and includes an incoming voice call control unit that sends a response message indicating that a mobile communication device is moving to a switching device in response to an incoming voice call message notified from the switching device and, when the incoming voice call message is sent again from the switching device after a lapse of a specified period of time, performs call attempt to the mobile communication device through the SGSN, in a case where a second location registration area managed by the mobility management device exists within a first location registration area managed by the SGSN, and an incoming voice call is made to the mobile communication device during when the mobile communication device is moving out of the second location registration area in the first location registration area.

A communication system according to a second exemplary aspect of the invention includes an SGSN that manages a first location registration area, a mobility management device that manages a second location registration area overlapping a part of the first location registration area, and a switching device that notifies an incoming voice call to a mobile communication device through the mobility management device, and, in a case where an incoming voice call is made to the mobile communication device during when the mobile communication device is moving out of the second location registration area in the first location registration area, the mobility management device sends a response message indicating that the mobile communication device is moving to the switching device in response to an incoming voice call message notified from the switching device and, when the incoming voice call message is sent again from the switching device after a lapse of a specified period of time, performs call attempt to the mobile communication device through the SGSN.

An incoming voice call control method according to a third exemplary aspect of the invention is an incoming voice call control method executed in a mobility management device that makes an ISR feature operate in collaboration with an SGSN, and, in a case where a second location registration area managed by the mobility management device exists within a first location registration area managed by the SGSN, and an incoming voice call is made to a mobile communication device during when the mobile communication device is moving out of the second location registration area in the first location registration area, the method sends a response message indicating that the mobile communication device is moving to a switching device in response to an incoming voice call message notified from the switching device and, when the incoming voice call message is sent again from the switching device after a lapse of a specified period of time, performs call attempt to the mobile communication device through the SGSN.

A program according to a fourth exemplary aspect of the invention is a program executed by a computer of a mobility management device that makes an ISR feature operate in collaboration with an SGSN, the program causing the computer to execute a step of sending a response message indicating that a mobile communication device is moving to a switching device in response to an incoming voice call message notified from the switching device, and a step of performing call attempt to the mobile communication device through the SGSN when the incoming voice call message is sent again from the switching device after a lapse of a specified period of time, in a case where a second location registration area managed by the mobility management device exists within a first location registration area managed by the SGSN, and an incoming voice call is made to the mobile communication device during when the mobile communication device is moving out of the second location registration area in the first location registration area.

Advantageous Effects of Invention

According to the invention, it is possible to provide a mobility management device, a communication system, a voice incoming call control method and a program that can normally provide a UE with a notification of an incoming voice call that is made when ISR is activated in an MME and an SGSN and when a mobile communication device is moving from a location registration area under control of the MME to a location registration area under control of the SGSN in the ECM-CONNECTED state.

DESCRIPTION OF EMBODIMENTS

First Exemplary Embodiment

Figure 1:
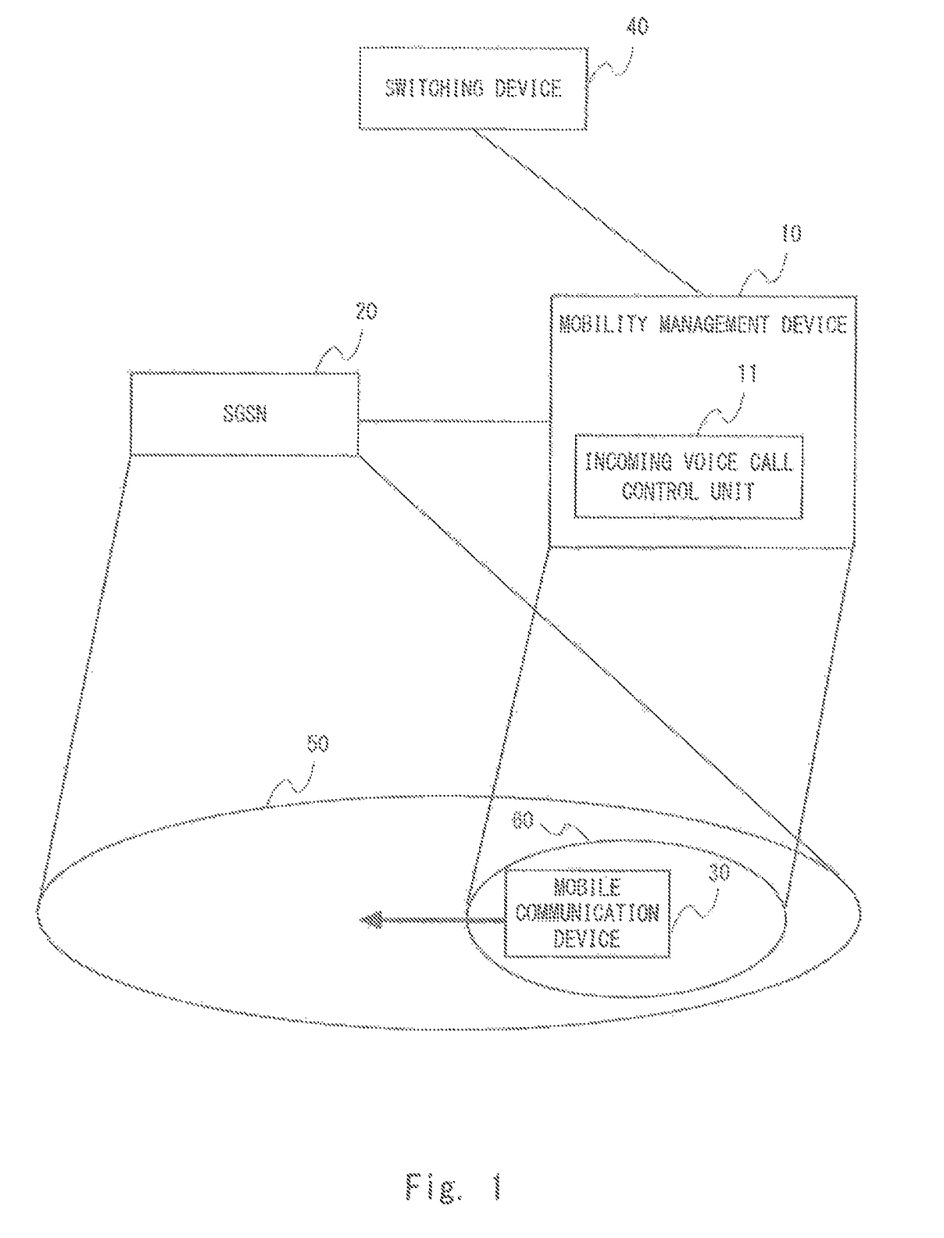
FIG. 1 is a configuration diagram of a communication system according to a first exemplary embodiment.

Exemplary embodiments of the present invention are described hereinafter with reference to the drawings. A configuration example of a communication system according to a first exemplary embodiment of the invention is described with reference to FIG. 1. The communication system shown in FIG. 1 is composed of node devices specified in the 3GPP. The communication system in FIG. 1 includes a mobility management device 10, an SGSN 20, a mobile communication device 30, and a switching device 40.

The mobility management device 10 and the SGSN 20 make the ISR feature operate in collaboration with each other. Stated differently, the mobility management device 10 and the SGSN 20 enable the ISR feature incorporated in each of them. The SGSN 20 manages a location registration area 50. The mobility management device 10 manages a location registration area 60. The location registration area 50 includes the location registration area 60. Accordingly, a part of the location registration area 50 and the location registration area 60 are overlapping areas.

In FIG. 1, the mobile communication device 30 moves out of the location registration area 60 in the location registration area 50.

The switching device 40 notifies the mobile communication device 30 through the mobility management device 10 about an incoming voice call. In the case where the mobile communication device 30 is located inside the location registration area 60, the switching device 40 notifies the mobile communication device 30 through the mobility management device 10 about the incoming voice call. In the case where the mobile communication device 30 is located outside the location registration area 60 and inside the location registration area 50, the switching device 40 notifies the mobile communication device 30 through the mobility management device 10 and the SGSN 20 about the incoming voice call and the SGSN 20.

A configuration example of the mobility management device 10 is described hereinafter. The mobility management device 10 includes an incoming voice call control unit 11. The case where an incoming voice call is made to the mobile communication device 30 during the time when the mobile communication device 30 is moving out of the location registration area 60 in the location registration area 50 is described. "During moving" is the state where processing for movement of the mobile communication device 30 has not yet completed in the mobility management device 10 and the SGSN 20 and, for example, the state where handover processing for the mobile communication device 30 has not yet completed therein.

In the case where the incoming voice call control unit 11 detects that the mobile communication device 30 has moved out of the location registration area 60 when an incoming voice call message is notified from the switching device 40, the incoming voice call control unit 11 sends a response message indicating that the mobile communication device 30 is during its movement to the switching device 40. For example, the incoming voice call control unit 11 may detect that the mobile communication device 30 has moved out of the location registration area 60 when it performs incoming call processing for the mobile communication device 30 and then receives a notification that transmission of an incoming voice call notification message to the mobile communication device 30 has failed from a base station that has been managing the mobile communication device 30. When an incoming voice call is not normally notified to the mobile communication device 30 through the mobility management device 10, the switching device 40 retransmits the incoming voice call message after the lapse of a specified period of time.

At the time when the incoming voice call message is retransmitted from the switching device 40 after the lapse of a specified period of time, the mobile communication device 30 has completed handover to the position outside the location registration area 60 and inside the location registration area 50, and therefore the incoming voice call control unit 11 sends a message indicating a call of the mobile communication device 30 to the SGSN 20. In other words, the mobility management device 10 performs call attempt to the mobile communication device 30 through the SGSN 20.

As described above, with use of the communication device shown in FIG. 1, even in the case where an incoming voice call is made to the mobile communication device 30 when the ISR feature is activated in the mobility management device 10 and the SGSN 20 and during the time when the mobile communication device 30 is moving out of the location registration area 60 in the location registration area 50, the switching device 40 can successfully notify the mobile communication device 30 about an incoming voice call.

In general, in the case where the ISR feature is activated in the mobility management device 10 and the SGSN 20, location registration processing of the mobile communication device 30 is not executed even when the mobile communication device 30 has moved out of the location registration area 60 in the location registration area 50. For example, in the case where an incoming voice call to the mobile communication device 30 is made before movement processing of the mobile communication device 30 ends, that is, before handover processing ends, the mobility management device 10 performs call attempt to the mobile communication device 30, assuming that the mobile communication device 30 is located within the location registration area 60. At this time, if the mobility management device 10 accepts the incoming voice call message notified from the switching device 40, the switching device 40 stops a retransmission timer for the incoming voice call message and therefore does not retransmit the incoming voice call message to the mobility management device 10. In such a case, because the ISR feature is activated, the mobile communication device 30 does not perform location registration processing for the switching device 40. Accordingly, the switching device 40 does not have a chance to send the incoming voice call message again to the mobile communication device 30 that has moved out of the location registration area 60.

Therefore, in the case where the mobility management device 10 fails in calling the mobile communication device 30, the switching device 40 cannot send the incoming voice call message to the mobile communication device 30.

On the other hand, with use of the communication device shown in FIG. 1, in response to an incoming voice call message notified from the switching device, the mobility management device 10 sends a response message indicating that the mobile communication device 30 is during its movement, instead of sending a message indicating that the incoming voice call message is received, to the switching device 40. It is thereby possible to prevent the switching device 40 from stopping the retransmission timer, and the mobility management device 10 receives the incoming voice call message again after expiration of the retransmission timer in the switching device 40.

By the time when the mobility management device 10 receives the incoming voice call message again, handover processing of the mobile communication device 30 has completed because of the lapse of a specified period of time, and therefore it is possible to perform call attempt to the mobile communication device 30 through the SGSN 20. The retransmission timer for an incoming voice call message in the switching device 40 may be set in consideration of the execution time of handover processing of the mobile communication device 30. As described above, with use of the communication device shown in FIG. 1, it is possible to reliably notify the mobile communication device 30 about the incoming voice call message.

Second Exemplary Embodiment

Figure 2:
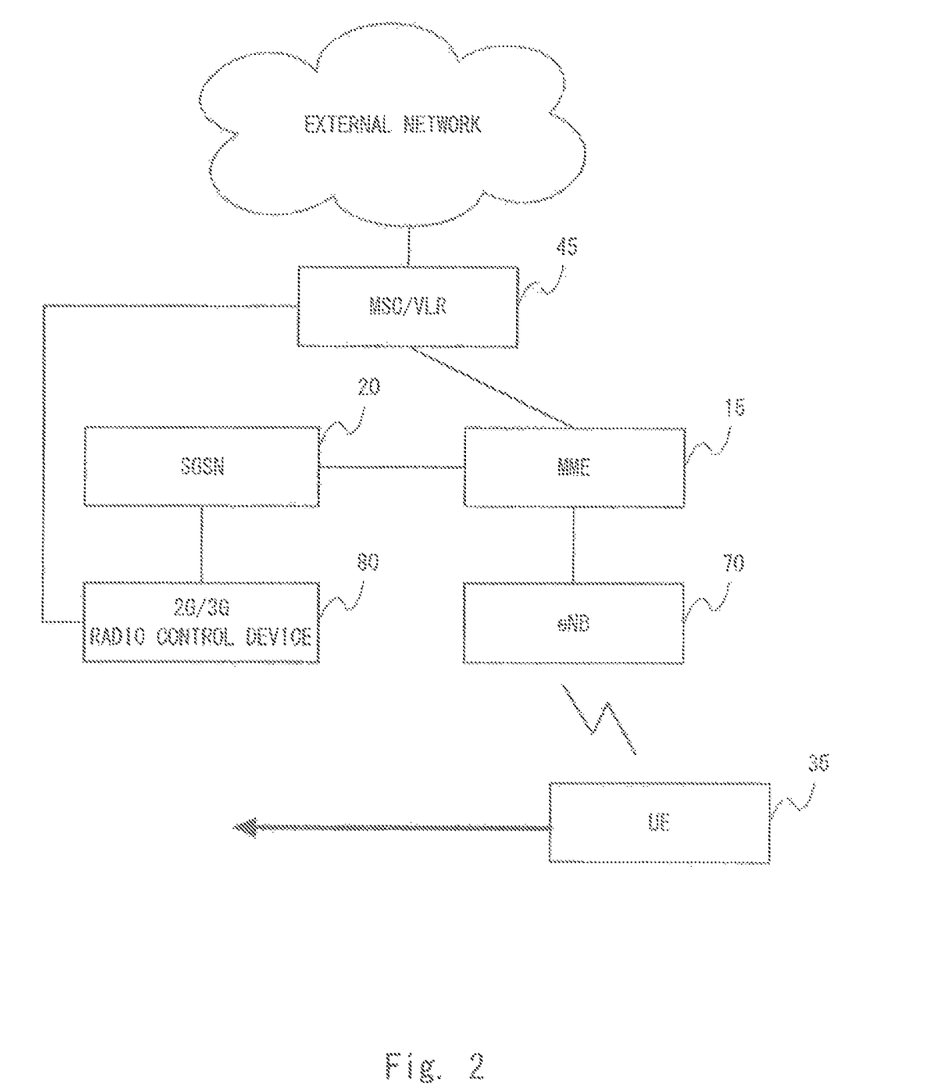
FIG. 2 is a configuration diagram of a communication system according to a second exemplary embodiment.

A configuration example of a communication system according to a second exemplary embodiment of the invention is described with reference to FIG. 2. The communication system shown in FIG. 2 includes an MME 15, an SGSN 20, a UE 35, an MSC/VLR 45, an eNB (evolved Node B) 70 and a 2G/3G radio control device 80. The MSC/VLR 45 is connected to an external network.

The MME 15 is equivalent of the mobility management device 10 in FIG. 1. The MSC/VLR 45 is equivalent of the switching device 40 in FIG. 1. The UE 35 is equivalent of the mobile communication device 30 in FIG. 1. The eNB 70 is a base station device that manages the LTE wireless area. The 2G/3G radio control device 80 is a radio control device that manages the 2G or 3G wireless area. The 2G/3G radio control device 80 may be an RNC (Radio Network Controller) specified in the 3GPP, for example.

The UE 35 is a communication device that is specified as a mobile communication device in the 3GPP. The UE 35 may be a cellular phone, a smartphone, a tablet terminal, a personal computer with a communication function or the like, for example. Further, the UE 35 may be an M2M (Machine To Machine) device that performs communications in an autonomous manner. The M2M device may be a device that does not often move such as an automatic vending machine or an electrical appliance having a communication function, or a watch worn by a user and the like, for example.

Figure 3:
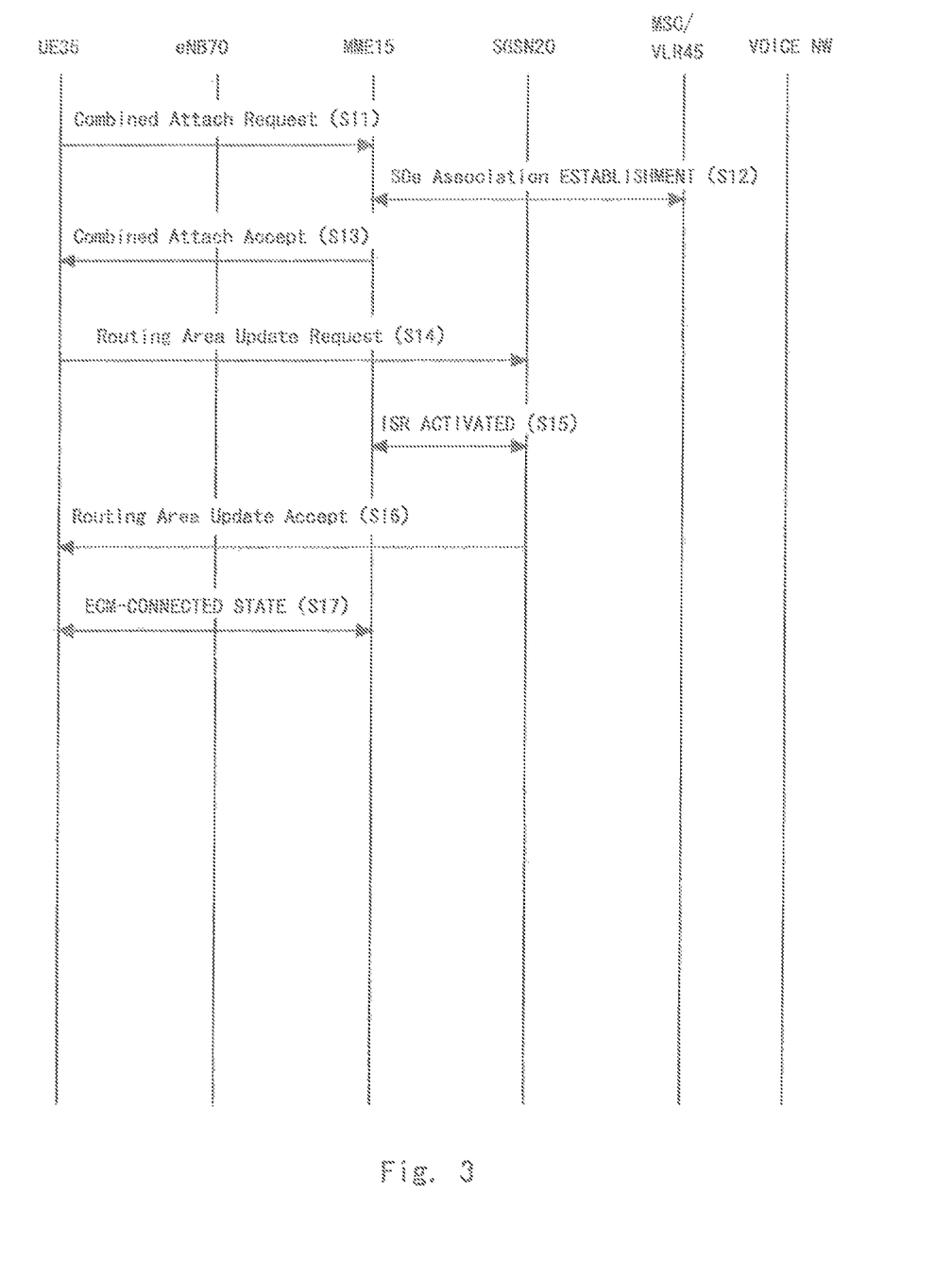
FIG. 3 is a diagram showing a flow of processing to connect a UE to a network according to the second exemplary embodiment.

Hereinafter, a flow of processing to connect the UE 35 to a network is described with reference to FIG. 3. First, the UE 35 sends a Combined Attach Request message to the MME 15 in order to make a request for registration of a line attachment location (S11). Receiving the Combined Attach Request message, the MME 15 generates location registration information of the UE 35. The location registration information contains information indicating that the UE 35 is located within the location registration area managed by the MME 15 or subscriber information of the UE 35, for example. The subscriber information of the UE 35 may be acquired from a subscriber information management device (not shown) that is placed in the mobile communication system. The subscriber information management device is specified as HSS (Home Subscriber Server) in the 3GPP, for example.

Next, the MME 15 establishes SGs association with the MSC/VLR 45 (S12). The SGs association is used to send and receive an incoming voice call message (CS (Call Switch) control signal) between the MME 15 and the MSC/VLR 45. After establishing the SGs association with the MSC/VLR 45, the MME 15 sends a Combined Attach Accept message to the UE 35 (S13).

Then, the UE 35 sends a Routing Area Update Request message to the SGSN 20 (S14). Receiving the Routing Area Update Request message, the SGSN 20 generates location registration information of the UE 35.

Then, the location registration information is synchronized between the SGSN 20 and the MME 15 to enable the ISR (S15). The SGSN 20 then sends a Routing Area Update Accept message to the UE 35 (S16). After execution of the processing in Steps S11 to S16, the UE 35 and the MME 15 become ECM-CONNECTED state (S17). The ECM-CONNECTED state is a state where a communication path for user data is established between the network and the UE 35.

A flow of incoming voice call processing for the UE 35 is described hereinafter with reference to FIG. 4. It is assumed that the processing of FIG. 3 has been already performed before executing the processing of FIG. 4, and the UE 35 and the MME 15 are in the ECM-CONNECTED state.

First, the MSC/VLR 45 receives an incoming voice call message sent from a voice network (S21). Next, the MSC/VLR 45 sends a Paging Request message to the MME 15 (S22). The MSC/VLR 45 sends the Paging Request message through the SGs association established between the MSC/VLR 45 and the MME 15. In other words, the MSC/VLR 45 sends the Paging Request message by the SGs interface. After sending the Paging Request message, the MSC/VLR 45 starts a retransmission timer that specifies the timing to retransmit the Paging message (S23).

Even when the MME 15 receives the Paging Request message, it does not send a response message (Service Request message) indicating that an incoming voice call is accepted to the MSC/VLR 45. If an incoming voice call is accepted by the MME 15, the MSC/VLR 45 stops the timer that has been started to retransmit the incoming voice call message (Paging Request message). Thus, in order to prevent the retransmission timer from stopping, the MME 15 does not send the Service Request message to the MSC/VLR 45.

Then, the MME 15 sends a CS Service Notification message to notify the UE 35 through the eNB 70 about an incoming voice call (S24). It is noted that the UE 35 starts moving out of the location registration area 60 before the CS Service Notification message is sent from the eNB 70 (S25). In this case, the eNB 70 abandons transmission of the CS Service Notification message to the UE 35 (S26) based on that fact that the UE 35 has already started moving out of the location registration area 60. Note that, although the case where transmission of the CS Service Notification message to the UE 35 (S26) is abandoned is described in the following description, when the eNB 70 sends the CS Service Notification message to the UE 35 and then a response message (NAS extended Service Request message) is sent from the UE 35 to the MME 15 after that, the MME 15 sends a Service Request message to the MSC/VLR 45 upon receiving the NAS extended Service Request message.

Then, the eNB 70 sends a NAS Non-Delivery Indication message indicating that transmission of the CS Service Notification message to the UE 35 has failed to the MME 15 (S27). Receiving the NAS Non-Delivery Indication message, the MME 15 sends a paging reject message to which cause is set indicating failure of transmission of the CS Service Notification message to the UE 35 due to movement of the UE 35 to the MSC/VLR 45 (S28).

Then, the eNB 70 sends a Handover Required message to the MME 15 in order to start handover processing of the UE 35 (S29). The MME 15 performs handover processing with the SGSN 20 (S30). After registration of the UE 35 is done in the handover processing, the SGSN 20 sends a Forward Relocation Complete Notification message to the MME 15 (S31). Then, the MME 15 sends a Forward Relocation Complete Acknowledge message to the SGSN 20 as a response message to the Forward Relocation Complete Notification message (S32). After the handover processing of the UE 35 is completed in the above manner, the UE 35 and the SGSN 20 become PMM-CONNECTED state. The PMM-CONNECTED state is a state where a communication path for user data is established between the network and the UE 35.

Then, when the retransmission timer for the Paging Request message expires, the MSC/VLR 45 retransmits the Paging Request message to the MME 15 (S35). The MME 15 then sends a CS Paging Indication message with an indication to perform call attempt to the UE 35 to the SGSN 20 since the UE 35 has already moved to the area under control of the SGSN 20 (S36). The SGSN 20 then performs call attempt to the UE 35 (S37).

Figure 4:
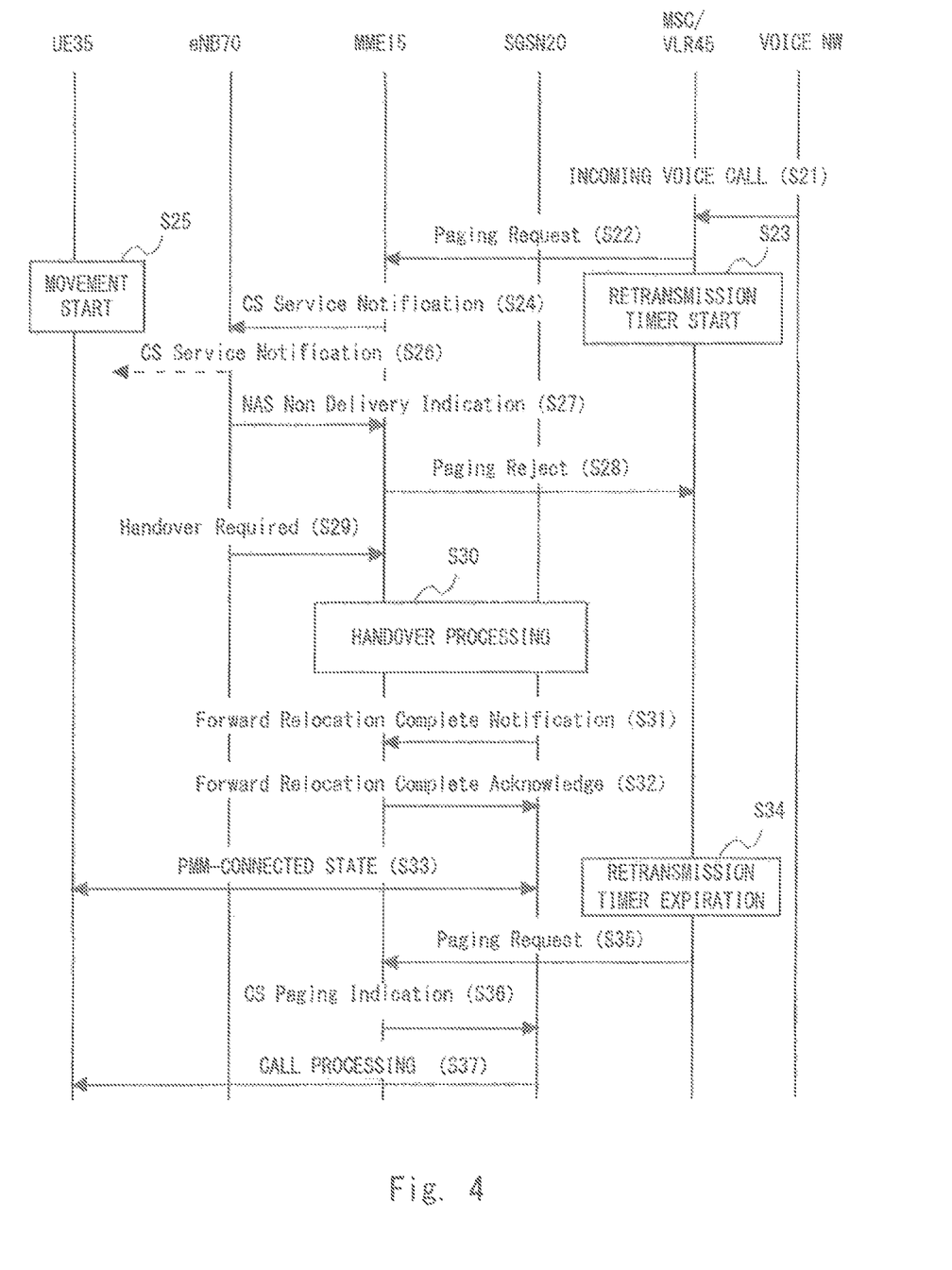
FIG. 4 is a diagram showing a flow of incoming voice call processing according to the second exemplary embodiment.

As described above, by executing the incoming voice call processing shown in FIG. 4, it is possible to prevent the retransmission timer from stopping in the MSC/VLR 45. The MSC/VLR 45 can thereby send the Paging Request message again to the MME 15 and therefore notify the UE 35 after the handover is done about an incoming voice call.

Third Exemplary Embodiment

A flow of incoming voice call processing for the UE 35 according to a third exemplary embodiment of the invention is described hereinafter with reference to FIG. 5. It is assumed that the processing of FIG. 3 has been already performed before executing the processing of FIG. 5, and the UE 35 and the MME 15 are in the ECM-CONNECTED state.

First, the UE 35 starts moving out of the location registration area 60 in the location registration area 50 (S41). Next, the eNB 70 sends a Handover Required message to the MME 15 in order to start handover processing of the UE 35 (S42). In the EPC, which is the network, the Handover Required message is the first message in the handover processing. The MSC/VLR 45 receives an incoming voice call message sent from the voice network (S43). The MSC/VLR 45 then sends a Paging Request message to the MME 15 (S44). After sending the Paging Request message, the MSC/VLR 45 starts the retransmission timer that specifies the timing to retransmit the Paging message (S45).

Figure 5:
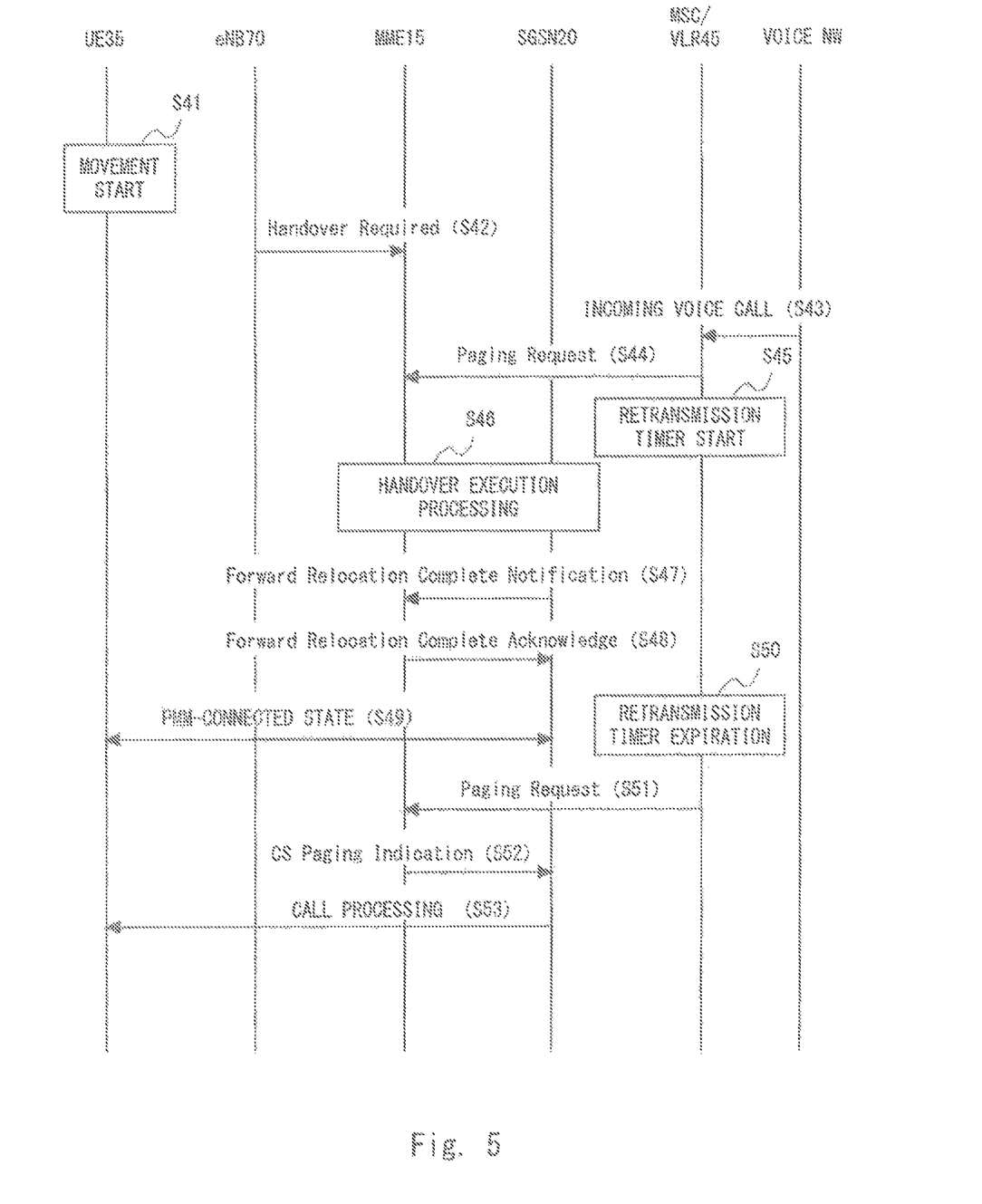
FIG. 5 is a diagram showing a flow of incoming voice call processing according to a third exemplary embodiment.

FIG. 5 is different from FIG. 4 in that the MME 15 receives the Paging Request message after receiving the Handover Required message. In the case of receiving the messages in this order, the MME 15 does not perform processing that accompanies reception of the Paging Request message. Specifically, in FIG. 5, the MME 15 does not perform the processing in Steps S24 to S28 in FIG. 4. In other words, the MME 15 does not perform transmission of the CS Service Notification message to the UE 35, which is processing in response to reception of the Paging Request message, and abandons or discards the Paging Request message. On the other hand, the MME 15 preferentially performs processing that accompanies reception of the Handover Required message, rather than processing that accompanies reception of the Paging Request message, which is incoming call processing to the UE 35.

Steps S46 to S53 are the same as Steps S30 to S37 in FIG. 4 and not redundantly described in detail. In this figure, the MME 15 does not send the CS Service Notification message to the eNB 70 when it first receives the Paging Request message sent from the MSC/VLR 45 in Step S44. When the Paging Request message is sent in Step S51 upon expiration of the retransmission timer in the MSC/VLR 45, the MME 15 performs call attempt to the UE 35 through the SGSN 20.

As described above, by performing the flow of the incoming voice call processing in FIG. 5, even when an incoming voice call is made to the UE 35 during execution of handover processing of the UE 35, it is possible to notify the UE 35 about the incoming voice call after completion of the handover processing of the UE 35.

Further, the MME 15 does not perform incoming voice call processing in response to the Paging Request message received first, and performs call attempt to the UE 35 only after the Paging Request message is retransmitted after that, which allows reduction of the number of signals in the network compared to the case of FIG. 4. It is thereby possible to simplify the flow of the incoming voice call processing and reduce the processing load of the network.

Third Exemplary Embodiment

A flow of incoming voice call processing according to a third exemplary embodiment of the present invention is described hereinafter with reference to FIG. 6. It is assumed that the processing of FIG. 3 has been already performed before executing the processing of FIG. 6, and the UE 35 and the MME 15 are in the ECM-CONNECTED state. Steps S61 to S69 are the same as Steps S41 to S49 in FIG. 5 and not redundantly described in detail.

Figure 6:
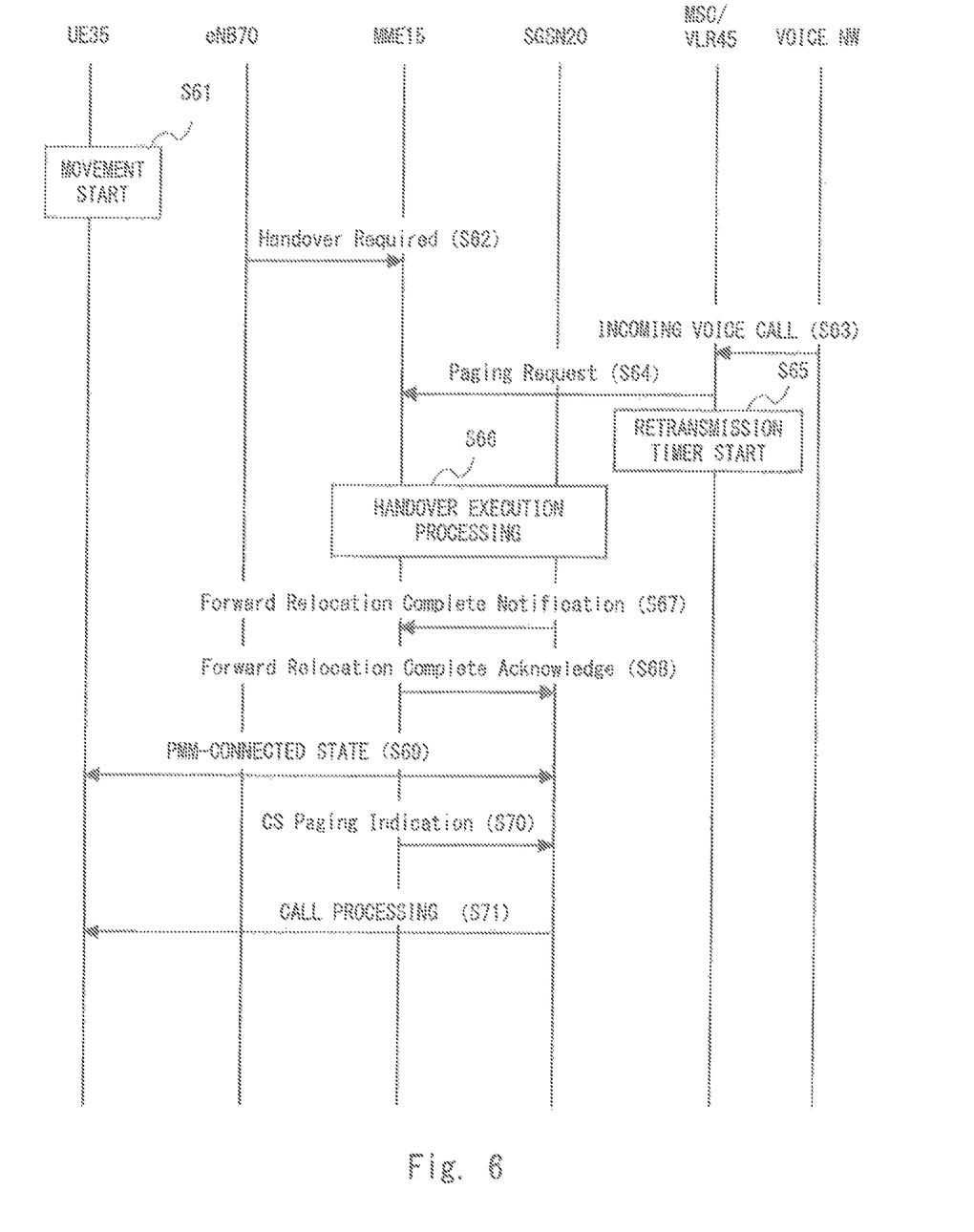
FIG. 6 is a diagram showing a flow of incoming voice call processing according to a fourth exemplary embodiment.

In FIG. 6, at the time when the UE 35 and the SGSN 20 have become the PMM-CONNECTED state (S69) after completion of handover processing, the MME 15 sends a CS Paging Indication message to the SGSN 20 if it has received the Paging Request message during the handover processing (S70). Note that the MME 15 determines that the UE 35 and the SGSN 20 have become the PMM-CONNECTED state (S69) by sending a Forward Relocation Complete Acknowledge message to the SGSN 20 in Step S68 and then sends a CS Paging Indication message to the SGSN 20 (S70).

In FIG. 5, the MME 15 sends the CS Paging Indication message to the SGSN 20 upon transmission of the Paging Request message from the MSC/VLR 45. On the other hand, in this figure, the MME 15 sends the CS Paging Indication message to the SGSN 20 upon completion of handover processing without waiting for retransmission of the Paging Request message, which is different from the processing of FIG. 5.

To implement the processing of this figure, the incoming voice call control unit 11 of the MME 15 needs to know that the Paging Request message has been received from the MSC/VLR 45 in Step S64. For example, the incoming voice call control unit 11 may have a Paging Request message reception flag or the like and set the flag to on when it receives the Paging Request message.

As described above, by performing the flow of the incoming voice call processing in FIG. 6, even when an incoming voice call is made to the UE 35 during execution of handover processing of the UE 35, it is possible to notify the UE 35 about the incoming voice call after completion of the handover processing of the UE 35.

Further, the MME 15 can send the CS Paging Indication message to the SGSN 20 without waiting for retransmission of the Paging Request message, and it is thereby possible to perform call attempt to the UE 35 earlier than the case of FIG. 5.

Fourth Exemplary Embodiment

A flow of incoming voice call processing according to a fourth exemplary embodiment of the present invention is described hereinafter with reference to FIG. 7. It is assumed that the processing of FIG. 3 has been already performed before executing the processing of FIG. 7, and the UE 35 and the MME 15 are in the ECM-CONNECTED state. Steps S81 to S87 are the same as Steps S41 to S47 in FIG. 5 and not redundantly described in detail.

In Step S88, the MME 15 sends a Forward Relocation Complete Acknowledge message as a response signal to the Forward Relocation Complete Notification message sent from the SGSN 20 (S88). In this step, the MME 15 sets information indicating execution of calling to the UE 35 to the Forward Relocation Complete Acknowledge message. Specifically, the MME 15 sets information which is set to the CS Paging Indication message in Step S36 of FIG. 4 to the Forward Relocation Complete Acknowledge message and sends it.

Because the MME 15 sets information which is set to the CS Paging Indication message to the Forward Relocation Complete Acknowledge message and sends it in Step S88, it is possible to notify the UE 35 about completion of handover processing and further indicate calling.

Next, upon completion of the handover processing, the UE 35 and the SGSN 20 become the ECM-CONNECTED state (S89). Then, the SGSN 20 performs call attempt to the UE 35 based on the indication of calling to the UE 35 notified in Step S88 (S90).

Figure 7:
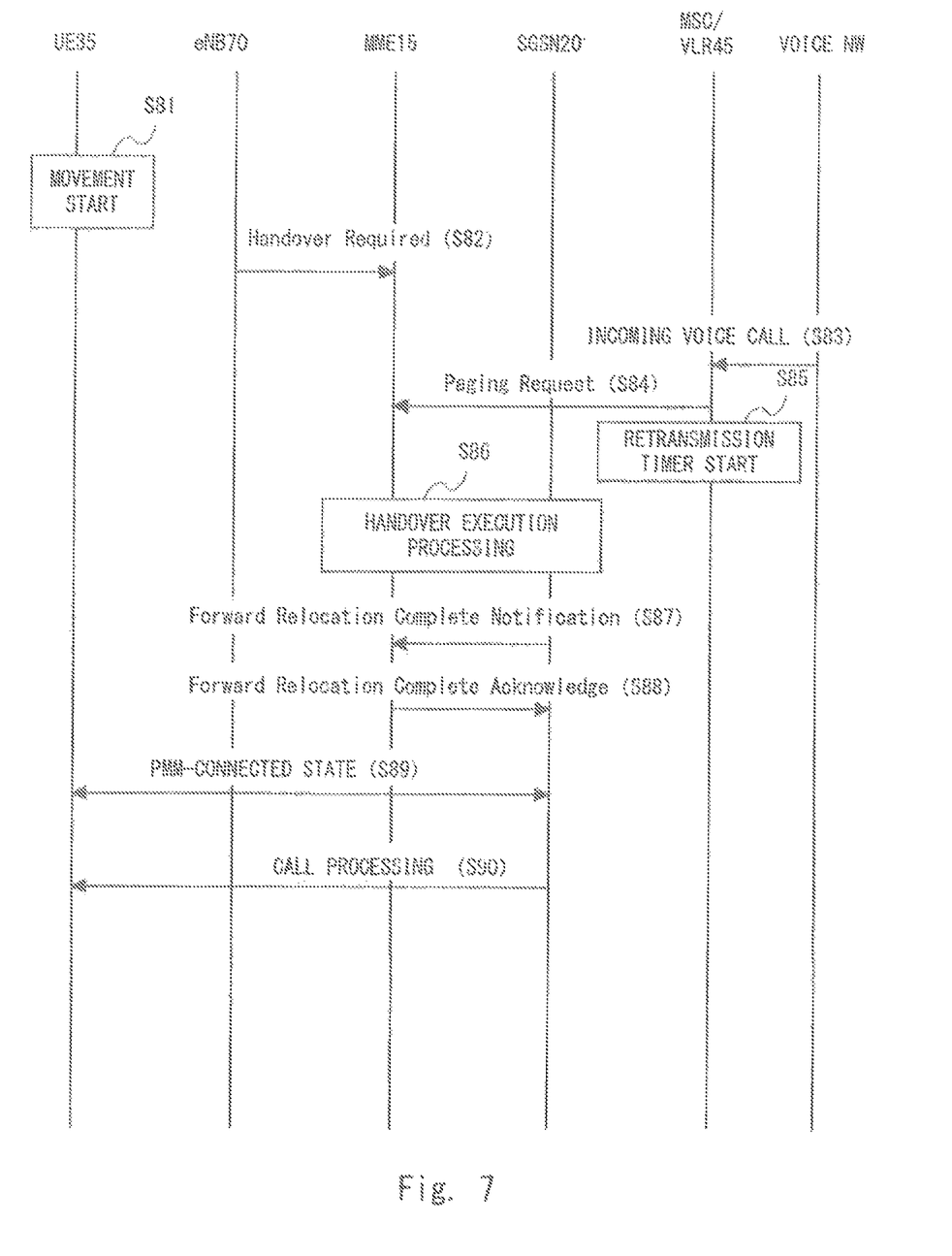
FIG. 7 is a diagram showing a flow of incoming voice call processing according to a fifth exemplary embodiment.

As described above, by performing the flow of the incoming voice call processing in FIG. 7, even when an incoming voice call is made to the UE 35 during execution of handover processing of the UE 35, it is possible to notify the UE 35 about the incoming voice call after completion of the handover processing of the UE 35.

Further, the MME 15 sets information indicating execution of calling to the UE 35 to the Forward Relocation Complete Acknowledge message that notifies completion of handover processing. This eliminates the need to send the CS Paging Indication message which is sent in Step S70 of FIG. 6 and thereby reduces the number of messages between the MME 15 and the SGSN 20. It is thereby possible to reduce the processing load of the network.

Furthermore, because the number of messages can be reduced compared with the case of FIG. 6, it is possible to perform call attempt to the UE 35 earlier than the processing of FIG. 6.

Figure 8:
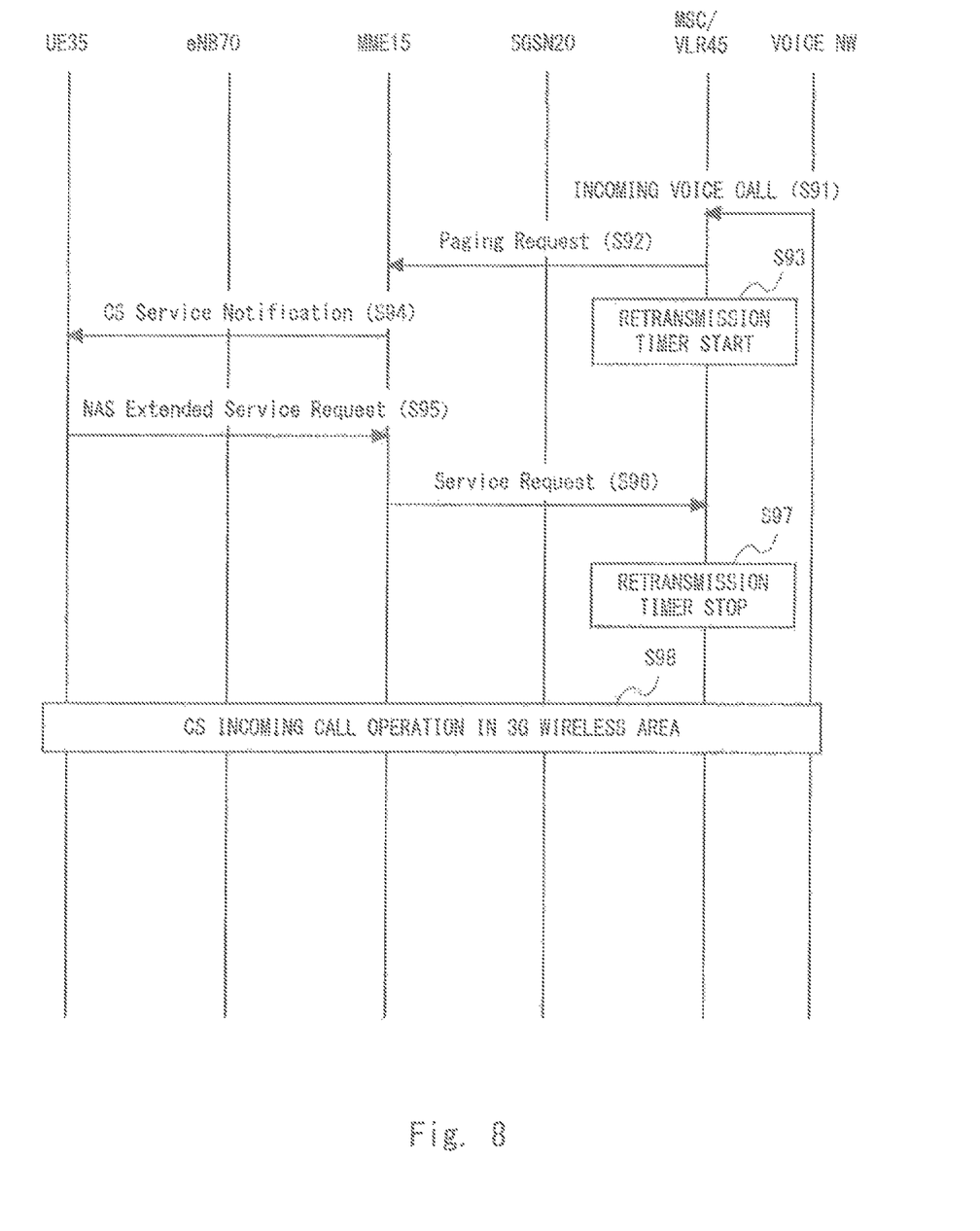
FIG. 8 is a diagram showing a flow of incoming voice call processing according to a fifth exemplary embodiment.

A flow of incoming voice call processing for the UE 35 is described hereinafter with reference to FIG. 8. FIG. 8 shows the operation in the case where a conflict between handover processing and incoming voice call processing does not occur and a notification of an incoming voice call is successfully given to the UE 35, for comparison with the operation examples shown in FIGS. 4 to 7. It is assumed that the processing of FIG. 3 has been already performed before executing the processing of FIG. 8, and the UE 35 and the MME 15 are in the ECM-CONNECTED state.

First, the MSC/VLR 45 receives an incoming voice call message sent from a voice network (S91). Next, the MSC/VLR 45 sends a Paging Request message to the MME 15 (S92). After sending the Paging Request message, the MSC/VLR 45 starts the retransmission timer that specifies the timing to retransmit the Paging message (S93).

Then, the MME 15 sends a CS Service Notification message to notify the UE 35 through the eNB 70 about an incoming voice call (S94).

Receiving the CS Service Notification, the UE 35 sends a NAS extended Service Request message to the MME 15 through the eNB 70 (S95).

Receiving the NAS extended Service Request message, the MME 15 sends a response message (Service Request message) indicating that an incoming voice call is accepted to the MSC/VLR 45 (S96). The response message (Service Request message) can also notify the MSC/VLR 45 that the UE 35 is in the ECM-CONNECTED state. When the incoming voice call is accepted by the MME 15, the MSC/VLR 45 stops the timer that has been started to retransmit the incoming voice call message (Paging Request message). By this operation, processing to retransmit the Paging Request message in the MSC/VLR 45 is stopped (S97). After that, the UE 35 moves to the 3G wireless area, and an incoming call operation using the 2G/3G radio control device 80 and the MSC/VLR 45 is continued (S98).

Although the present invention is described as a hardware configuration in the above exemplary embodiments, the present invention is not limited thereto. The present invention may be implemented by causing a CPU (Central Processing Unit) to execute a computer program to perform processing of the mobility management device, the switching device or the SGSN.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described exemplary embodiments but is susceptible of numerous changes and modifications as known to those skilled in the art; for example, the 2G/3G radio control device 80 may be a 3G radio control device, and the MSC/VLR 45 may be composed of separate MSC and VLR devices.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-079961 filed on Apr. 5, 2013 and Japanese patent application No. 2013-141828 filed on Jul. 5, 2013, the disclosure of which is incorporated herein in its entirety by reference.

REFERENCE SIGNS LIST

10 MOBILITY MANAGEMENT DEVICE
11 INCOMING VOICE CALL CONTROL UNIT
15 MME
20 SGSN
30 MOBILE COMMUNICATION DEVICE
35 UE
40 SWITCHING DEVICE
45 MSC/VLR
50 LOCATION REGISTRATION AREA
60 LOCATION REGISTRATION AREA
70 eNB
80 2G/3G RADIO CONTROL DEVICE

The invention claimed is:

1. A control node for operating as a Mobility Management Entity (MME) managing a location registration area in a mobile communication system, the control node comprising:
   a receiver configured to:
      receive a Handover Required message to initiate a handover procedure with a control node change from the control node to another control node; and
      receive a paging request message over an SGs interface between the control node and a switching node when the handover procedure is ongoing; and a controller configured to continue the handover procedure after the receiver receives the paging request message,
   wherein no further action related to the paging request message is performed; and
a transmitter configured to initiate a CS (Call Switch) service after the handover procedure.

2. The control node according to claim 1, wherein the switching node is operating as an MSC/VLR (Mobile Switching Center/Visitor Location Register).

3. The control node according to claim 1, wherein the handover procedure is performed when a movement of a terminal (UE (User Equipment)) is detected.

4. The control node according to claim 2, wherein the receiver receives the Handover Required message in a case where a terminal operating as an user equipment (UE) moves from the location registration area under a control of the control node to another location registration area under a control of the another control node.

5. A communication method performed by a control node for operating as a Mobility Management Entity (MME) managing a location registration area in a mobile communication system, the method comprising:
   receiving a Handover Required message to initiate a handover procedure with a control node change from the control node to another control node;
   receiving a paging request message over an SGs interface between the control node and a switching node when the handover procedure is ongoing;
   continuing the handover procedure after receiving the paging request message,
      wherein no further action related to the paging request message is performed; and
   initiating a CS (Call Switch) service after the handover procedure.

6. The communication method according to claim 5, wherein the switching node is operating as an MSC/VLR (Mobile Switching Center/Visitor Location Register).

7. The communication method according to claim 6, wherein the Handover Required message is received by the control node in a case where a terminal operating as an user equipment (UE) moves from the location registration area under a control of the control node to another location registration area under a control of the another control node.

8. A terminal for operating as an User Equipment (UE) used in a mobile communication system having a first control node for operating as a Mobility Management Entity (MME) managing a first location registration area and a second control node managing a second location registration area, the terminal comprising:

a controller configured to perform a handover procedure with a control node change from the first control node to the second control node; and
a receiver configured to receive a notification about a CS (Call Switch) service after the handover procedure which is initiated based on a Handover Required message,
   wherein no further action related to a paging request message is performed by the first control node and the handover procedure is continued if the handover procedure is ongoing when the first control node receives the paging request message over an SGs interface between the first control node and a switching node.

9. The terminal of claim 8, wherein the receiver receives the notification from a base station.

10. The terminal of claim 8, wherein the first control node receives the paging request message from the switching node.

11. The terminal of claim 10, wherein the switching node is operating as an MSC/VLR (Mobile Switching Center/Visitor Location Register).

12. The terminal of claim 10, wherein the handover procedure is initiated in a case where the terminal moves from the first location registration area under a control of the first control node to the second location registration area under a control of the second control node.

13. A communication method for a terminal for operating as an User Equipment (UE) used in a mobile communication system having a first control node for operating as a Mobility Management Entity (MME) managing a first location registration area and a second control node managing a second location registration area, the method comprising:
   performing a handover procedure with control node change from the first control node to the second control node; and
   receiving a notification about a CS (Call Switch) service after the handover procedure which is initiated based on a Handover Required message, wherein no further action related to a paging request message is performed by the first control node and the handover procedure is continued if the handover procedure is ongoing when the first control node receives the paging request message over an SGs interface between the first control node and a switching node.

14. The communication method of claim 13, wherein the switching node is operating as an MSC/VLR (Mobile Switching Center/Visitor Location Register).

* * * * *